United States Patent [19]

Chang

[11] Patent Number: 4,912,075

[45] Date of Patent: * Mar. 27, 1990

[54] METHOD FOR PREPARING A SUPPORTED METALLOCENE-ALUMOXANE CATALYST FOR GAS PHASE POLYMERIZATION

[75] Inventor: Main Chang, Houston, Tex.

[73] Assignee: Exxon Chemical Patents Inc., Linden, N.J.

[ * ] Notice: The portion of the term of this patent subsequent to Feb. 27, 2007 has been disclaimed.

[21] Appl. No.: 134,413

[22] Filed: Dec. 17, 1987

[51] Int. Cl.$^4$ .................................................. C08F 4/64
[52] U.S. Cl. ...................................... 502/107; 502/104; 502/111; 502/117; 502/120; 556/179
[58] Field of Search ............... 502/107, 111, 117, 120, 502/104; 556/179

[56] References Cited

U.S. PATENT DOCUMENTS

| | | | |
|---|---|---|---|
| 3,300,458 | 1/1967 | Manyik et al. | 502/111 X |
| 4,508,843 | 4/1985 | Etherton et al. | 502/108 X |
| 4,530,914 | 7/1985 | Ewen et al. | 502/113 |
| 4,544,762 | 10/1985 | Kaminsky et al. | 556/179 |
| 4,568,658 | 2/1986 | Cook et al. | 502/120 X |
| 4,665,208 | 5/1987 | Welborn et al. | 502/117 X |
| 4,701,432 | 10/1987 | Welborn | 502/120 X |
| 4,808,561 | 2/1989 | Welborn | 502/117 X |

FOREIGN PATENT DOCUMENTS 0170059  5/1986  European Pat. Off. .

*Primary Examiner*—Patrick P. Garvin
*Attorney, Agent, or Firm*—M. B. Kurtzman

[57] ABSTRACT

This invention relates to a process for preparing a supported metallocene alumoxane catalyst for use in the gas phase polymerization of olefins. The invention particularly relates to the use of silica gel containing from about 6 to about 10 percent by weight adsorbed water as the catalyst support material. It has been found that such silica gel may be safely added to an aluminum trialkyl solution to form by direct reaction with the adsorbed water content of the silica gel catalyst support material the alumoxane component of the catalyst system. An alumoxane coated silica gel is formed to which a metallocene may be added and the resulting material dried to free flowing powder. The dry free flowing powder may then be used as a supported metallocene alumoxane catalyst complex for gas phase polymerization of olefins.

20 Claims, No Drawings

METHOD FOR PREPARING A SUPPORTED METALLOCENE-ALUMOXANE CATALYST FOR GAS PHASE POLYMERIZATION

This invention relates to a process for preparing a supported metallocene alumoxane catalyst for use in the gas phase polymerization of olefins. The invention particularly relates to the use of silica gel containing from about 6 to about 10 percent by weight adsorbed water as the catalyst support material. It has been found that such silica gel may be safely added to an aluminum trialkyl solution to form, by direct reaction with the adsorbed water content of the silica gel catalyst support material, the alumoxane component of the catalyst system. An alumoxane coated silica gel is formed to which a metallocene may be added and the resulting material dried to free flowing powder. The dry free flowing powder may then be used as a supported metallocene alumoxane catalyst complex for gas phase polymerization of olefins.

BACKGROUND TO THE INVENTION

Olefin polymerization catalysts comprising a metallocene and an aluminum alkyl component were first proposed in about 1956. Australian patent 220436 proposed for use as a polymerization catalyst a bis-(cyclopentadienyl) titanium, zirconium, or vanadium salt as reacted with a variety of halogenated or unhalogenated aluminum alkyl compounds. Although such complexes were capable of catalyzing the polymerization of ethylene, such catalytic complexes, especially those made by reaction with an aluminum trialkyl, had an insufficient level of catalytic activity to be employed commercially for production of polyethylene or copolymers of ethylene.

Later it was found that certain metallocenes such as bis-(cyclopentadienyl) titanium, or zirconium dialkyls in combination with aluminum alkyl/water cocatalyst form catalyst systems for the polymerization of ethylene. Such catalysts are discussed in German Patent Application 2,608.863 which discloses a polymerization catalyst for ethylene consisting of bis-(cyclopentadienyl) titanium dialkyl, aluminum trialkyl and water. German Patent Application 2,608,933 discloses an ethylene polymerization catalyst consisting of a cyclopentadienyl zirconium salt, an aluminum trialkyl cocatalyst and water. European Patent Application No. 0035242 discloses a process for preparing ethylene and atactic propylene polymers in the presence of a halogen free cyclopentadienyl transition metal salt and an alumoxane. Such catalysts have sufficient activity to be commercially useful and enable the control of polyolefin molecular weight by means other than hydrogen addition—such as by controlling the reaction temperature or by controlling the amount of cocatalyst alumoxane as such or as produced by the reaction of water with an aluminum alkyl.

To realize the benefits of such catalyst systems, one must use or produce the required alumoxane cocatalyst component. An alumoxane is produced by the reaction of an aluminum alkyl with water. The reaction of an aluminum alkyl with water is very rapid and highly exothermic. Because of the extreme violence of the reaction the alumoxane cocatalyst component has, heretofore, been separately prepared by one of two general methods. Alumoxanes may be prepared by adding an extremely finely divided water, such as in the form of a humid solvent, to a solution of aluminum alkyl in benzene or other aliphatic hydrocarbons. The production of an alumoxane by such procedures requires use of explosion-proof equipment and very close control of the reaction conditions in order to reduce potential fire and explosion hazards. For this reason, it has been preferred to produce alumoxane by reacting an aluminum alkyl with a hydrated salt, such as hydrated copper sulfate. In such procedure a slurry of finely divided copper sulfate pentahydrate and toluene is formed and mantled under an inert gas. Aluminum alkyl is then slowly added to the slurry with stirring and the reaction mixture is maintained at room temperature for 24 to 48 hours during which a slow hydrolysis occurs by which alumoxane is produced. Although the production of alumoxane by a hydrated salt method significantly reduces the explosion and fire hazard inherent in the wet solvent production method, production of an alumoxane by reaction with a hydrated salt must be carried out as a process separate from that of producing the metallocene alumoxane catalyst itself, is slow, and produces hazardous wastes that create disposal problems. Further, before the alumoxane can be used for the production of an active catalyst complex the hydrated salt reagent must be separated from the alumoxane to prevent it from becoming entrained in the catalyst complex and thus contaminating any polymer produced therewith.

Only in those situations wherein a hydrated material is of a chemical composition acceptable as a filler material for a filled polyolefin composition may it be used to produce a metallocene/alumoxane catalyst complex by direct reaction with an aluminum alkyl solution. Hence U.S. Patent 4,431,788 discloses a process for producing a starch filled polyolefin composition wherein an aluminum trialkyl is first reacted with starch particles of a moisture content below 7 weight percent. The starch particles are then treated with a (cyclopentadienyl)-chromium, titanium, vanadium or zirconium alkyl to form a metallocene alumoxane catalyst complex on the surface of the starch particles. An olefin is then polymerized about the starch particles by solution or suspension polymerization procedures to form a free-flowing composition of polyolefin-coated starch particles. German Patent 3,240,382 likewise discloses a method for producing a filled polyolefin composition which utilizes the water content of an inorganic filler material to directly react with an aluminum trialkyl and produce thereon an active metallocene alumoxane catalyst complex. Polymer is produced by solution or gas phase procedures at the filler surface to uniformly coat the filler particles and provide a filled polymer composition.

German Patent 3,240,382 notes that the activity of a metallocene alumoxane catalyst is greatly impaired or lost when prepared as a surface coating on an inorganic material. Although German Patent 3,240,382 suggests that an inorganic material containing absorbed or adsorbed water may be used as a filler material from which the alumoxane cocatalyst component may be prepared by direct reaction with an aluminum trialkyl, the only water containing inorganic filler materials which are identified as capable of producing the alumoxane without adversely affecting the activity of the metallocene alumoxane catalyst complex are certain inorganic materials containing water of crystallization or bound water, such as gypsum or mica. German Patent 3,240,382 does not illustrate the production of a catalyst coated inorganic filler material wherein the inorganic material is one having absorbed or adsorbed water. Nor does German Patent 3,240,382 describe an inorganic filler material having absorbed or adsorbed water which has surface area or pore volume properties suitable for service as a catalyst support for a gas phase polymerization procedure.

It would be desirable to devise an economical procedure whereby an active supported metallocene/alumoxane catalyst could be safely produced for use as a gas phase polymerization catalyst. To be economical the procedure should dispense with the requirement of producing the alumoxane component as a separate component apart from the procedure by which the catalyst itself is prepared.

SUMMARY OF THE INVENTION

The process of this invention utilizes as the catalyst support material silica particles having a surface area in the range of about 10 m²/g to about 700 m²/g preferably about 100-500 m²/g and desirably about 200-400 m²/g, a pore volume of about 3 to about 0.5 cc/g and preferably 2-1 cc/g and an adsorbed water content of from about 6 to about 10 weight percent, preferably from about 7 to about 9 weight percent, and most preferably about 8 weight percent. Such silica particles are referred to hereafter as an undehydrated silica gel. The silica gel supported metallocene alumoxane catalyst is prepared by adding the undehydrated silica gel to a stirred solution of aluminum trialkyl in an amount sufficient to provide a mole ratio of aluminum trialkyl to water of from about 3:1 to about 1:2, preferably 1.2:1 to about 0.9:1; thereafter adding to this stirred solution a metallocene in an amount sufficient to provide an aluminum to transitional metal ratio of from about 1000:1 to 1:1, preferably from about 300:1 to 10:1, most preferably from about 150:1 to about 30:1; removing the solvent and drying the solids to a free flowing powder. Drying can be obtained by modest heating or vacuum.

The dried free flowing powder comprises a metallocene alumoxane catalyst complex adsorbed upon the surface of the silica gel support particles. The supported catalyst complex has an activity sufficient for use as a gas phase polymerization catalyst for polymerization of olefins by conventional gas phase polymerization procedures.

DETAILED DESCRIPTION OF THE PREFERRED EMBODIMENTS

The present invention is directed towards a method for preparing a supported catalyst system for use in the gas phase polymerization of olefins, particularly the gas phase polymerization of ethylene to high molecular weight polyethylenes such as linear low density polyethylene (LLDPE) and high density polyethylene (HDPE). The polymers are intended for fabrication into articles by extrusion, injection molding, thermoforming, rotational molding, and the like. In particular, the polymers prepared with the catalyst complex and by the method of this invention are homopolymers of ethylene and copolymers of ethylene with higher alpha-olefins having from 3 to about 10 carbon atoms and preferably 4 to 8 carbon atoms. Illustrative of the higher alpha-olefins are butene-1, hexene-1, and octene-1.

In the process of the present invention, ethylene, either alone or together with alpha-olefins having three or more carbon atoms, is polymerized in the presence of a silica gel supported catalyst system comprising at least one metallocene and an alumoxane.

In accordance with this invention, one can also produce olefin copolymers, particularly copolymers of ethylene and higher alpha-olefins having from 3-18 carbon atoms.

The active catalyst complex prepared by the process of this invention comprises a metallocene and an alumoxane adsorbed onto the surface of a silica gel support material. Alumoxanes are oligomeric aluminum compounds represented by the general formula $(R-Al-O)_y$ which is believed to be a cyclic compound and $R(R-Al-O-)_y AlR_2$, which is a linear compound. In the general formula, "R" is a $C_1-C_{10}$ alkyl group such as, for example, methyl, ethyl, propyl, butyl, and pentyl and "y" is an integer from 2 to about 30 and represents the degree of oligomerization of the alumoxane. Preferably, "R" is methyl and "y" is about 4 to about 25 and most preferably 6-25. Generally, in the preparation of alumoxanes from, for example, the reaction of aluminum trimethyl and water, a mixture of linear and cyclic compounds is obtained. Generally, an alumoxane having a higher degree of oligomerization will, for a given metallocene, produce a catalyst complex of higher activity than will an alumoxane having a lower degree of oligomerization. Hence, the procedure by which alumoxane is produced by direct reaction of an aluminum trialkyl with an undehydrated silica gel should insure the conversion of the bulk quantity of the aluminum trialkyl to an alumoxane having a high degree of oligomerization. In accordance with this invention the desired degree of oligomerization is obtained by the order of addition of reactants as described hereinafter.

The metallocene may be any of the organometallic coordination compounds obtained as a cyclopentadienyl derivative of a transition metal. Metallocenes which are useful for preparing an active catalytic complex according to the process of this invention are the mono, bi and tri cyclopentadienyl or substituted cyclopentadienyl metal compounds and most preferably, bicyclopentadienyl compounds. The metallocenes particularly useful in this invention are represented by the general formulas:

  I.

wherein Cp is a cyclopentadienyl ring, M is a Group 4b or 5b transition metal and preferably a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3,

 and  II.

  III.

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radicals containing from 1 to 20 carbon atoms, a silicon-containing hydrocarbyl radical, or a hydrocarbyl radical wherein two carbon atoms are joined together to form a $C_4-C_6$ ring, R" is $C_1-C_4$ alkylene radical, a dialkyl germanium or silicone, or an alkyl phosphine or amine radical bridging two $(C_5R'_k)$ rings. Q is a hydrocarbyl radical such as aryl, alkyl, alkenyl, alkylaryl, or arylalkyl having 1–20 carbon atoms, hydrocarboxy radical having 1–20 carbon atoms or halogen and can be the same or different, Q' is an alkylidene radical having from 1 to about 20 carbon atoms, s is 0 or 1, g is 0, 1 or 2; when g is 0, s is 0; k is 4 when s is 1 and k is 5 when s is 0 and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary alkylene radicals are methylene, ethylene, propylene, and the like. Exemplary halogen atoms include chlorine, bromine and iodine and of these halogen atoms, chlorine is preferred. Exemplary of the alkylidene radicals is methylidene, ethylidene and propylidene.

Of the metallocenes, zirconocenes and titanocenes are most preferred. Illustrative but non-limiting examples of these metallocenes which can be usefully employed in accordance with this invention are monocyclopentadienyl titanocenes such as, cyclopentadienyl titanium trichloride, pentamethylcyclopentadienyl titanium trichloride; bis(cyclopentadienyl) titanium diphenyl; the carbene represented by the formula $Cp_2Ti=CH_2 \cdot Al(CH_3)_2Cl$ and derivatives of this reagent such as $Cp_2Ti=CH_2 \cdot Al(CH_3)_3$, $(Cp_2TiCH_2)_2$, $Cp_2TiCH_2CH(CH_3)CH_2$, $Cp_2Ti=CHCH_2CH_2$, $Cp_2Ti=CH_2 \cdot AlR'''_2Cl$, wherein Cp is a cyclopentadienyl or substituted cyclopentadienyl radical, and R''' is an alkyl, aryl, or alkylaryl radical having from 1–18 carbon atoms; substituted bis(Cp) Ti(IV) compounds such as bis(indenyl) Ti diphenyl or dichloride, bis(methylcyclopentadienyl) Ti diphenyl or dihalides and other dihalide complexes; dialkyl, trialkyl, tetra-alkyl and penta-alkyl cyclopentadienyl titanium compounds such as bis(1,2-dimethylcyclopentadienyl) Ti diphenyl or dichloride, bis(1,2)-diethylcyclopentadienyl) Ti diphenyl or dichloride and other dihalide complexes; silicone, phosphine, amine or carbon bridged cyclopentadiene complexes, such as dimethyl silyldicyclopentadienyl titanium diphenyl or dichloride, methylenedicyclopentadienyl titanium diphenyl or dichloride and other dihalide complexes and the like.

Illustrative but non-limiting examples of the zirconocenes which can be usefully employed in accordance with this invention are cyclopentadienyl zirconium trichloride, pentamethylcyclopentadienyl zirconium trichloride, bis(cyclopentadienyl) zirconium diphenyl, bis(cyclopentadienyl) zirconium dichloride, the alkyl substituted cyclopentadienes, such as bis(ethyl cyclopentadienyl) zirconium dimethyl, bis(β-phenylpropylcyclopentadienyl) zirconium dimethyl, bis(methylcyclopentadienyl) zirconium dimethyl, and dihalide complexes of the above; di-alkyl, tri-alkyl, tetra-alkyl, and penta-alkyl cyclopentadienes, such as bis(pentamethylcyclopentadienyl) zirconium dimethyl, bis(1,2-dimethylcyclopentadienyl) zirconium dimethyl, bis(1,3-diethylcyclopentadienyl) zirconium dimethyl and dihalide complexes of the above; silicone, phosphorus, and carbon bridged cyclopentadiene complexes such as dimethylsilyldicyclopentadienyl zirconium dimethyl or dihalide, methylphosphine dicyclopentadienyl zirconium dimethyl or dihalide, and methylene dicyclopentadienyl zirconium dimethyl or dihalide, carbenes represented by the formulae 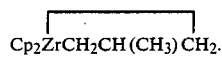 and derivatives of these compounds such as

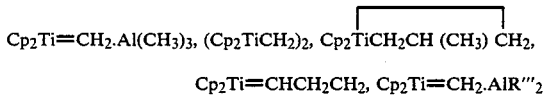

Bis(cyclopentadienyl) hafnium dichloride, bis(cyclopentadienyl) hafnium dimethyl, bis(cyclopentadienyl) vanadium dichloride and the like are illustrative of other metallocenes.

Generally the use of a metallocene which comprises a bis(substituted cyclopentadienyl) zirconium will provide a catalyst complex of higher activity than a corresponding titanocene or a mono cyclopentadienyl metal compound. Hence bis(substituted cyclopentadienyl) zirconium compounds are preferred for use as the metallocene.

Heretofore the alumoxane component of the active catalyst complex has been separately prepared then added as such to a catalyst support material which is then treated with a metallocene to form the active catalyst complex. One procedure heretofore employed for preparing the alumoxane separately is that of contacting water in the form of a moist solvent with a solution of aluminum trialkyl in a suitable organic solvent such as benzene or aliphatic hydrocarbon. As before noted this procedure is attendant with fire and explosion hazards which require the use of explosion-proof equipment and carefully controlled reaction conditions. In an alternative method heretofore employed for the separate production of alumoxane an aluminum alkyl is contacted with a hydrated salt, such as hydrated copper sulfate. The method comprised treating a dilute solution of aluminum alkyl in, for example, toluene with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing a metallocene alumoxane catalyst.

In accordance with the present invention the alumoxane component of the catalyst complex is prepared by direct reaction of an aluminum trialkyl with the material utilized as the catalyst support, namely an undehydrated silica gel. Silica useful as the catalyst support is that which has a surface area in the range of about 10 to about 700 m²/g, preferably about 100–500 and desirably about 200–400 m²/g, a pore volume of about 3 to about 0.5 cc/g and preferably 2–1 cc/g, and an adsorbed water content of from about 6 to about 10 weight percent, preferably from about 7 to about 9 weight percent, and most preferably about 7.5 to about 8.5 weight percent. The particle size of the silica should be from about 10μ to about 100μ, and preferably from about 30μ to about 60μ (1μ = 10⁻⁶m). Hereafter, silica having the above identified properties is referred to as undehydrated silica gel.

Undehydrated silica gel, as defined above, is added over time, about a few minutes, to a stirred solution of aluminum trialkyl, preferably trimethyl aluminum or triethyl aluminum, in an amount sufficient to provide a mole ratio of aluminum trialkyl to water of from about 3:1 to 1:2, preferably about 1.2:1 to 0.9:1. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like. Also suitable for use as the aluminum trialkyl are tripropyl aluminum, tri-n-butyl aluminum tri-isobutyl aluminum, tri(2-methyl-pentyl) aluminum, trihexyl aluminum, tri-n-octyl aluminum, and tri-n-decyl aluminum.

Upon addition of the undehydrated silica gel to the solution of aluminum trialkyl, the water content of the silica gel controllably reacts with the aluminum trialkyl to produce an alumoxane which is deposited onto the surface of the silica gel particles. Although the reaction of the aluminum trialkyl with the water content of the silica gel proceeds relatively quickly, that is, it is generally completed within the time of about 5 minutes, it does not occur with the explosive quickness of that which occurs with free water. The reaction may be safely conducted in conventional mixing equipment under a mantle of inert gas.

Thereafter a metallocene is added to the stirred suspension of alumoxane silica gel product in an amount sufficient to provide a mole ratio of aluminum to transition metal of from about 1000:1 to about 1:1, preferably from about 300:1 to about 10:1 and most preferably from about 150:1 to about 30:1. The mixture is stirred for about 30 minutes to about one hour at ambient or an elevated temperature of about 75° C. to permit the metallocene to undergo complete complexing reaction with the adsorbed alumoxane. Thereafter, the solvent is removed and the residual solids are dried, preferably at a temperature of 75° C. or greater, to a free flowing powder. The free flowing powder comprises a silica gel supported metallocene alumoxane catalyst complex of sufficiently high catalytic activity for use in the gas phase polymerization of olefins by conventional gas phase polymerization procedures.

The order of addition between the undehydrated silica gel and the aluminum trialkyl is important with regard to the activity of the supported catalyst which results upon addition of the metallocene. A supported catalyst composition of little or no activity results wherein an aluminum trialkyl is added to a stirred solvent suspension of undehydrated silica gel. It has been found that to prepare a supported catalyst composition of acceptable or high activity the order of mixing must be one wherein the undehydrated silica gel is added to a stirred solution of the aluminum trialkyl. It is believed that this order of mixing forces the aluminum trialkyl to undergo reaction in the context of a transient localized excess of aluminum trialkyl compared to a transient localized deficiency of water. Under a mixing condition which slowly adds undehydrated silica get to a stirred solution of aluminum trialkyl, the bulk content of the aluminum trialkyl converts to an alumoxane with a degree of oligomerization of about 6-25 (y-6-25). Production of an alumoxane with this degree of oligomerization results in a final metallocene alumoxane catalyst complex of useful or high activity. A reverse order of mixing, that is, addition of an aluminum trialkyl to a stirred solvent suspension of undehydrated silica gel yields a catalyst which has a poor degree of catalytic activity.

In addition to the importance of proper mixing order in achieving a supported catalyst of useful activity, it has also been observed that the water content of the undehydrated silica gel influences final catalyst activity. Hence the undehydrated silica gel should have an adsorbed water content of from about 6 to about 10 weight percent. Preferably the adsorbed water content should be from about 7 to about 9 weight percent. Maximum catalyst activity for a given metallocene component is generally observed wherein the adsorbed water content of the undehydrated silica gel used as a support is from about 7.5 to about 8.5 weight percent.

Further influencing the degree of activity attained in the final supported catalyst complex is the mole ratio of aluminum trialkyl to the adsorbed water content of the undehydrated silica gel. The quantities of aluminum trialkyl employed should, in comparison to the quantity of undehydrated silica gel of specified adsorbed water content, be selected to provide a mole ratio of aluminum trialkyl to water of from about 3:1 to about 1:2, preferably from about 1.5:1 to about 0.8:1, more preferably from about 1.2:1 to about 0.9:1, and most preferably about 1.1:1 to 1.0:1. It has been observed that for a given metallocene, a maximum catalyst activity is generally observed in the aluminum trialkyl to water mole ratio range of about 1.2:1 to about 0.9:1. Depending upon the particular aluminum trialkyl selected for use, commercially acceptable catalyst activities are exhibited in the aluminum trialkyl to water mole ratio range of about 3:1 to about 1:2.

Also influencing the cost of production and the level of catalytic activity obtained in the final supported catalyst complex is the mole ratio of aluminum to transition metal of the metallocene component. The quantity of metallocene added to the alumoxane adsorbed silica gel solids should be selected to provide an aluminum to transition metal mole ratio of from about 1000:1 to about 1:1, preferably from about 300:1 to about 10:1, and most preferably from about 150:1 to about 30:1. From the standpoint of economic considerations it is desirable to operate in the lower ranges of the aluminum to transition metal mole ratio in order to minimize the cost of catalyst production. The procedure of this invention is one which provides the maximum conversion of the aluminum trialkyl component to the most efficacious form of alumoxane, hence permits the safe production of a supported metallocene alumoxane catalyst of useful activity with low quantities of the costly aluminum trialkyl component.

By appropriate selection of the type and relative amounts of the metallocene and the aluminum trialkyl cocatalyst precursor, one can attain by the present method the particular active catalyst complex desired for any particular application. For example, higher concentrations of alumoxane in the catalyst system generally result in higher molecular weight polymer product. Therefore, when it is desired to produce a high molecular weight polymer a higher concentration of aluminum trialkyl is used, relative to the metallocene, than when it is desired to produce a lower molecular weight material. For most applications the ratio of aluminum in the aluminum alkyl to total metal in the metallocene can be in the range of from about 300:1 to about 20:1, and preferably about 200:1 to about 50:1.

Following the addition of the metallocene to the alumoxane adsorbed on the silica gel solids, the solvent is removed by filtering or evaporation, and the residual solids are dried to a free flowing powder. Drying of the residual solids may be conducted at a temperature up to about 85° C., and preferably at a temperature of about 75° C. The dried free flowing powder comprises a metallocene alumoxane complex adsorbed upon the surface of the silica gel support particles. The dried state composition exhibits a level of catalytic activity useful for gas phase polymerization of olefins.

As disclosed in copending application Serial No. 728,111 filed Apr. 29, 1985, the molecular weight of the polymer product can be controlled by the judicious selection of substituents on the cyclopentadienyl ring and use of ligands for the metallocene. Further, the comonomer content can be controlled by the judicious selection of the metallocene. Hence, by the selection of catalyst components it is possible to tailor the polymer product with respect to molecular weight and density. Further, one may tailor the polymerization reaction conditions over a wide range of conditions for the production of polymers having particular properties.

In the examples following, the melt index (MI) and melt index ratio (MIR) were determined in accordance with ASTM test D-1238.

EXAMPLE 1 (COMPARATIVE)

Five L of methyl alumoxane (4 wt.% in toluene), previously prepared by reaction of trimethyl aluminum with water in toluene, is added slowly to 1.5 Kg of dehydrated silica gel. The silica gel was Davison 948 silica gel which had been dehydrated at 800° C. for 20 hours. Following addition of the methyl alumoxane, the silica gel suspension was stirred for 1.0 hours at room temperature. Thereafter, 300 mls of a 13 wt.% toluene solution of bis(n-butylcyclopentadienyl) zirconium dichloride [hereinafter $(nBuCp)_2ZrCl_2$] was slowly added to the stirred suspension of silica gel solids and stirring has continued for 0.5 hours at 75° C. Thereafter, the volatile solvent was evaporated by nitrogen purge at 85° C. to a free flowing powder.

The resulting free flowing powder comprised a metallocene alumoxane catalyst complex supported on silica gel wherein the ratio of aluminum to zirconium is 50:1. This free flowing powder was utilized as a catalyst for the gas phase polymerization of ethylene under the conditions and with the results as set forth in Table I and the discussion thereof.

EXAMPLE 2

Undehydrated silica gel was employed in accordance with the procedure of this invention to prepare a silica gel supported $(nBuCp)_2ZrCl_2$ methyl alumoxane catalyst complex, as follows:

Two hundred-sixty (260) milliliters of trimethylaluminum/ heptane solution (15%) and 300 ml of heptane are charged into a dried one-liter three-neck flask containing a magnetic stirring bar. Thereafter 100 g of undehydrated silica gel (Davison 948) which contains 7.63 wt.% water is added slowly into the flask through a solids addition vessel. The resulting mixture is allowed to react under stirring at room temperature for 1 hour. Thereafter 2.50 g of $(nBuCp)_2ZrCl_2$ dissolved in 120 ml heptane is injected into the flask and the resulting mixture is allowed to react under stirring for 30 minutes. The volatile solvent is then removed by nitrogen purging at 75° C. and the residual solids are dried to a free flowing powder by vacuum drying at ambient temperature.

The resulting free flowing powder comprised a metallocene methylalumoxane catalyst complex supported on a silica gel wherein the mole ratio of aluminum to zirconium is 67.4:1. This powder was utilized as a catalyst for the gas phase polymerization of ethylene under the conditions and with the results set forth in Table I and the discussion thereof.

EXAMPLE 3

The procedure of Example 2 was followed with the exception that the undehydrated silica gel (Davison 948) contained 7.79 wt.% water.

EXAMPLE 4

The procedure of Example 2 was followed with the exception that the undehydrated silica gel (Davison 948) contained 7.16 wt.% water.

EXAMPLE 5

The procedure of Example 2 was followed with the exception that the undehydrated silica gel (Davison 948) contained 7.38 wt.% water.

EXAMPLE 6

The procedure of Example 2 was followed with the exception that the trimethylaluminum/heptane solution (15%) is charged into a one-liter three-neck flask containing 100 g of undehydrated silica gel (Davison 948) which contains 7.38 wt.% water and 300 ml of heptane.

EXAMPLE 7

The procedure of Example 2 was followed with the exception that 260 ml of triethylaluminum/heptane solution (25%) is charged into a one-liter flask followed by the addition of 100 g of undehydrated silica gel (Davison 948) which contains 8.10 wt.% water.

EXAMPLE 8

The procedure of Example 7 was followed with the exception that the undehydrated silica gel (Davison 948) contained 8.28 wt.% water.

EXAMPLE 9

The procedure of Example 7 was followed with the exception that the undehydrated silica gel (Davison 948) contained 7.69 wt.% water.

EXAMPLE 10

The procedure of Example 7 was followed with the exception that the undehydrated silica gel (Davison 94B) contained 7.90 wt.% water.

EXAMPLE 11

The procedure of Example 7 was followed with the exception that the undehydrated silica gel (Davison 948) contained 8.08 wt.% water and after addition of the silica gel to the flask, the mixture was heated to 85° C.

EXAMPLE 12

The procedure of Example 7 was followed with the exception that a triethylaluminum/heptane solution (25%) is charged into a one-liter three-neck flask containing 100 g of undehydrated silica gel (Davison 948) which contains 8.10 wt.% water and 300 ml of heptane.

Catalyst Test A

The activity of the catalyst powders of Examples 1 to 12 were determined at ambient temperature and 5 psig ethylene pressure by the following procedure. A 125 milliliter vial was freshly cleaned, heated to 130° C. for 6 hours, cooled to room temperature and flushed with nitrogen for 10 minutes. The vial was provided with a magnetic stirring bar and 5 grams of catalyst composition was charged into the vial. At ambient temperature ethylene gas at psig was fed into the vial. Polymerization of the ethylene was allowed to proceed for one hour. The yield of polyethylene obtained with each catalyst composition is reported in Table I.

TABLE I
CATALYST TEST A RESULT

| Catalyst | | Amount Polyethylene Formed, g |
|---|---|---|
| Example | 1 (Comparative) | 5.2 |
| | 2 | 5.5 |
| | 3 | 4.4 |
| | 4 | 2.8 |
| | 5 | 5.2 |
| | 6 | 0.1 |
| | 7 | 4.4 |
| | 8 | 4.0 |
| | 9 | 1.5 |
| | 10 | 2.5 |
| | 11 | 3.3 |
| | 12 | 0.1 |

Catalyst Test B

The activity of the catalyst of Examples 1, 2, and 7 were determined in continuous fluid bed gas phase polymerization reactor at 300 psig total pressure. Ethylene was copolymerized with hexene-1 in each of these examples.

During the polymerization, ethylene, hexene-1, and nitrogen were continuously fed into the reactor to maintain constant gas compositions. Catalyst was injected into the reactor continuously at a rate of 0.5 g/hr to maintain a constant reaction rate. Polymer product was periodically removed from the reactor through a valve to maintain a constant polymer bed high in the reactor.

Each of the polymerization reactions was conducted for at least 48 hours to ensure that the product collected was representative product produced under the reaction conditions. Table II lists the polymer produced in each example.

TABLE II
CATALYST TEST B RESULT

| Catalyst | Temp. (°F.) | $C_6/C_2$ Ratio | Yield g/hr | MI* dg/min | *MIR | Density g/ml |
|---|---|---|---|---|---|---|
| Example 1 | 185 | 0.06 | 300 | 1.24 | 18.7 | 0.923 |
| 2 | 165 | 0.02 | 230 | 0.74 | 23.4 | 0.940 |
| 7 | 165 | 0.03 | 200 | 0.23 | 26.8 | 0.933 |

*Melt index (MI) and melt index ratio (MIR) were determined in accordance with ASTM D-1238.

The invention has been described with reference to its preferred embodiments. From this description, a person of ordinary skill in the art may appreciate changes that could be made in the invention which do not depart from the scope and spirit of the invention as described above and claimed hereafter.

I claim:

1. A process for preparing a supported metallocene alumoxane catalyst for gas phase polymerization of olefins, comprising the steps of:
    (a) adding undehydrated silica gel to a stirred solution of an aluminum trialkyl in an amount sufficient to provide a mole ratio of aluminum trialkyl to water of from about 3:1 to about 1:2 and allowing the mixture to react;
    (b) adding a metallocene to the reacted mixture;
    (c) removing the solvent;
    (d) drying the solids to a free flowing powder.

2. The process of claim 1, wherein said undehydrated silica gel has a water content of from about 6 to about 10 weight percent.

3. The process of claim 2, wherein the mole ratio of aluminum to transition metal in said metallocene is from about 1000:1 to about 1:1.

4. The process of claim 2, wherein said undehydrated silica gel has a water content of from about 7 to about 9 weight percent and the mole ratio of aluminum trialkyl to water is from about 1.2:1 to about 0.9:1.

5. The process of claim 4, wherein the mole ratio of aluminum to transition metal in said metallocene is from about 300:1 to about 10:1.

6. The process of claim 5, wherein the aluminum trialkyl is trimethyl aluminum or triethyl aluminum.

7. The process of claim 6, wherein said undehydrated silica gel has a water content of from about 7.5 to about 8.5 weight percent.

8. The process of claim 7, wherein said undehydrated silica gel has a surface area of from about 200 to about 400 m²/g, a pore volume of from about 1 to about 2 cc/g and a particle size of from about 30μ to about 60μ.

9. The process of claim 8, wherein the mole ratio of aluminum to transition metal in said metallocene is from about 150:1 to about 30:1.

10. The process of claim 9, wherein said solids are dried at a temperature of from about 75° C. to about 85° C.

11. A process for preparing a supported metallocene alumoxane catalyst for gas polymerization of ethylene and alpha olefin monomers, comprising the steps of:
    (a) adding undehydrated silica gel to a stirred solution of a aluminum trialkyl in an amount sufficient to provide a mole ratio of aluminum trialkyl to water of from about 3:1 to about 1:2 and allowing the mixture to react;
    (b) adding to the reaction mixture a metallocene of the formula: $(Cp)_m MR_n X_q$ wherein Cp is a cyclopentadienyl ring, M is a Group 4b or 5b transition metal, R is a hydrocarbyl group of hydrocarboxy group having from 1 to 20 carbon atoms, X is a halogen, and m is a whole number from 1 to 3. n is a whole number from 0 to 3, and q is a whole number from 0 to 3;

$(C_5R'_k)_g R''_s (C_5R'_k) MQ_{3-g'}$ or $R''_s(C_5R'_k)_2 MQ'$ wherein $(C_5R'_k)$ is a cyclopentadienyl or substituted cyclopentadienyl, each R' is the same or different and is hydrogen or a hydrocarbyl radical containing from 1 to 20 carbon atoms, a silicon-containing hydrocarbyl radical, or a hydrocarbyl radical wherein two carbon atoms are Joined together to form a $C_4$–$C_6$ ring, R'' is $C_1$–$C_4$ alkyene radical, a dialkyl germanium or silicone, or an alkyl phosphine or amine radical bridging two $(C_5R'_k)$ rings, Q is a hydrocarbyl radical having 1–20 carbon atoms, hydrocarboxy radical having 1–20 carbon atoms or halogen and can be the same or different, Q' is an alkylidene radical having from 1 to about 20 carbon atoms, s is 0 to 1, g is 0, 1 or 2; when g is 0, s is 0; k is 4 when s is 1 and k is 5 when s is 0 and M is as defined above;

(c) removing the solvent;

(d) drying the solids to a free flowing powder.

12. The process of claim 11 wherein said metallocene is zirconocene or titanocene.

13. The process of claim 12, wherein said zirconocene is selected from the group consisting of cyclopentadienyl zirconium trichloride; pentamethylcyclopentadienyl zirconium trichloride; bis(cyclopentadienyl) zirconium diphenyl; bis(cyclopentadienyl) zirconium dichloride; alkyl substituted cyclopentadienes, and their dihalide complexes; dialkyl, trialkyl, tetra-alkyl, and penta-alkyl cyclopentadienes, and their dihalide complexes; and silicone, phosphorus, and carbon bridged cyclopentadiene complexes.

14. The process of claim 12, wherein said titanocene is selected from the group consisting of monocyclopentadienyl titanocenes; bis(cyclopentadienyl) titanium diphenyl; carbenes represented by the formula $Cp_2Ti=CH_2 \cdot Al(CH_3)_2Cl$ wherein Cp is a cyclopentadienyl or substituted cyclopentadienyl radical; substituted bis(Cp)Ti(IV) compounds and their dihalide complexes; dialkyl, trialkyl, tetra-alkyl and penta-alkyl cyclopentadienyl titanium compounds and their dihalide complexes; and silicone, phosphine, amine or carbon bridged cyclopentadiene complexes, and their dihalide complexes.

15. The process of claim 12, wherein said undehydrated silica gel has a water content of from about 7 to about 9 weight percent and the mole ratio of aluminum trialkyl to water is from about 1.2:1 to about 0.9:1.

16. The process of claim 15, wherein the mole ratio of aluminum to transition metal in said metallocene is from about 300:1 to about 10:1.

17. The process of claim 16, wherein the aluminum trialkyl is trimethyl aluminum or triethyl aluminum.

18. The process of claim 17, wherein said undehydrated silica gel has a water content of from about 7.5 to about 8.5 weight percent.

19. The process of claim 1B, wherein said undehydrated silica gel has a surface area of from about 200 to about 400 $m^2/g$, a pore volume of from about 1 to about 2 cc/g and a particle size of from about 30$\mu$ to about 60$\mu$.

20. The process of claim 19, wherein the mole ratio of aluminum to transition metal in said metallocene is from about 150:1 to about 30:1.

* * * * *